No. 803,905. PATENTED NOV. 7, 1905.
A. KAMMERLOHER.
GRAIN CLEANER.
APPLICATION FILED SEPT. 6, 1902.

3 SHEETS—SHEET 1.

Witnesses.
A. H. Opsahl.
H. D. Kilgore

Inventor
Andrew Kammerloher
By his Attorneys
Williamson & Merchant

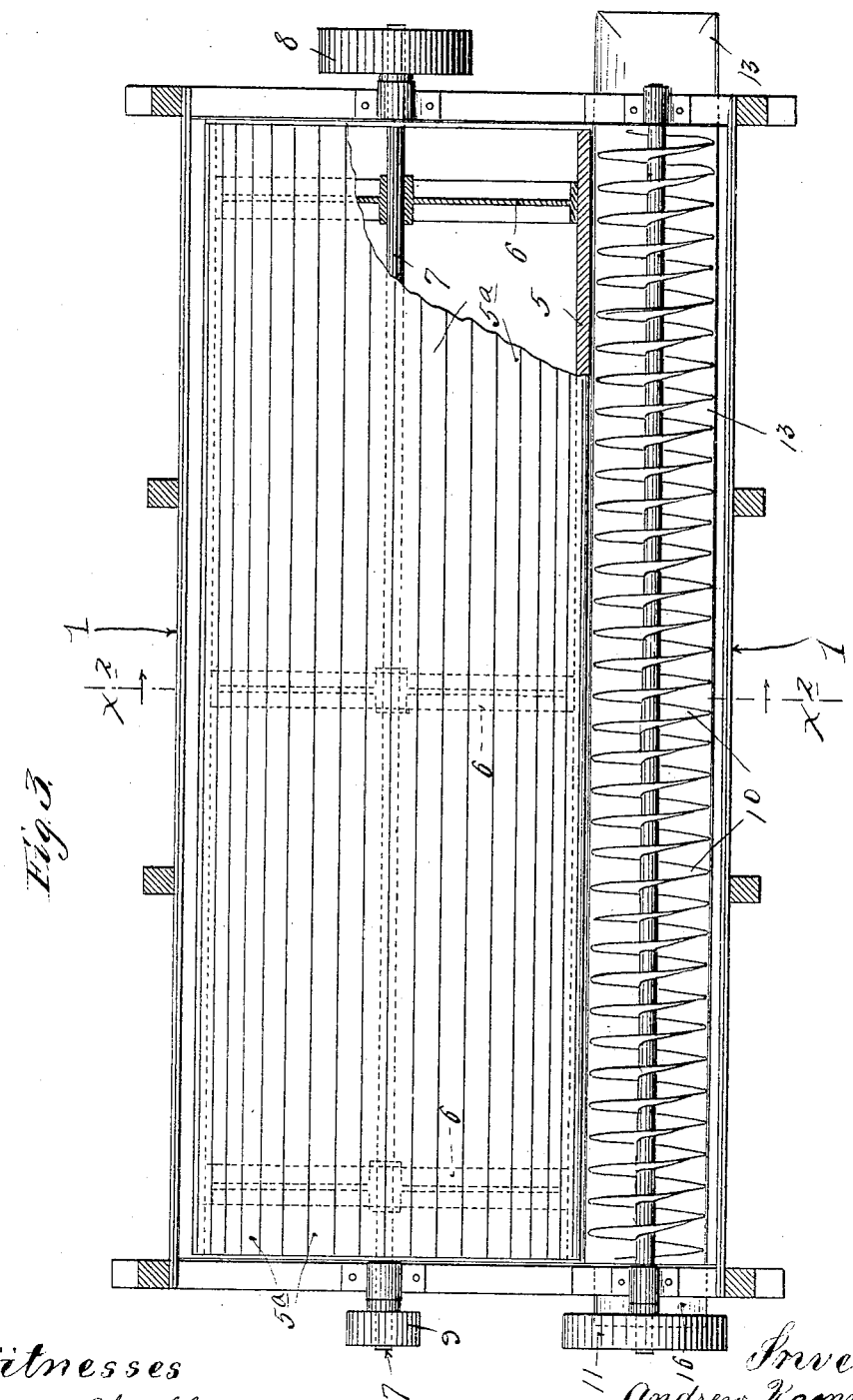

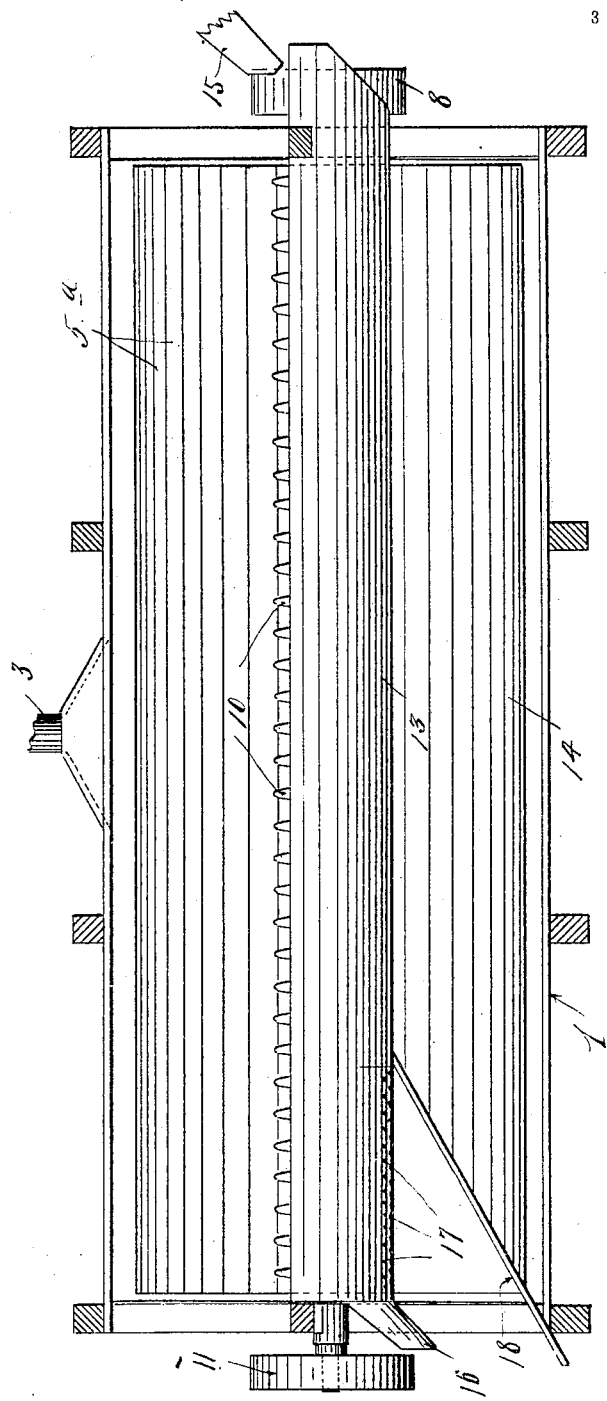

UNITED STATES PATENT OFFICE.

ANDREW KAMMERLOHER, OF MINNEAPOLIS, MINNESOTA.

GRAIN-CLEANER.

No. 803,905. Specification of Letters Patent. Patented Nov. 7, 1905.

Application filed September 6, 1902. Serial No. 122,283.

*To all whom it may concern:*

Be it known that I, ANDREW KAMMERLOHER, a citizen of the United States, residing at Minneapolis, in the county of Hennepin and State of Minnesota, have invented certain new and useful Improvements in Grain-Cleaners; and I do hereby declare the following to be a full, clear, and exact description of the invention, such as will enable others skilled in the art to which it appertains to make and use the same.

My invention has for its especial object to provide an improved apparatus for cleaning grain by what is known as the "dry process;" and to this end it consists of the novel devices and combinations of devices hereinafter described, and defined in the claim.

The invention is illustrated in the accompanying drawings, wherein like characters indicate like parts throughout the several views.

Figure 1:
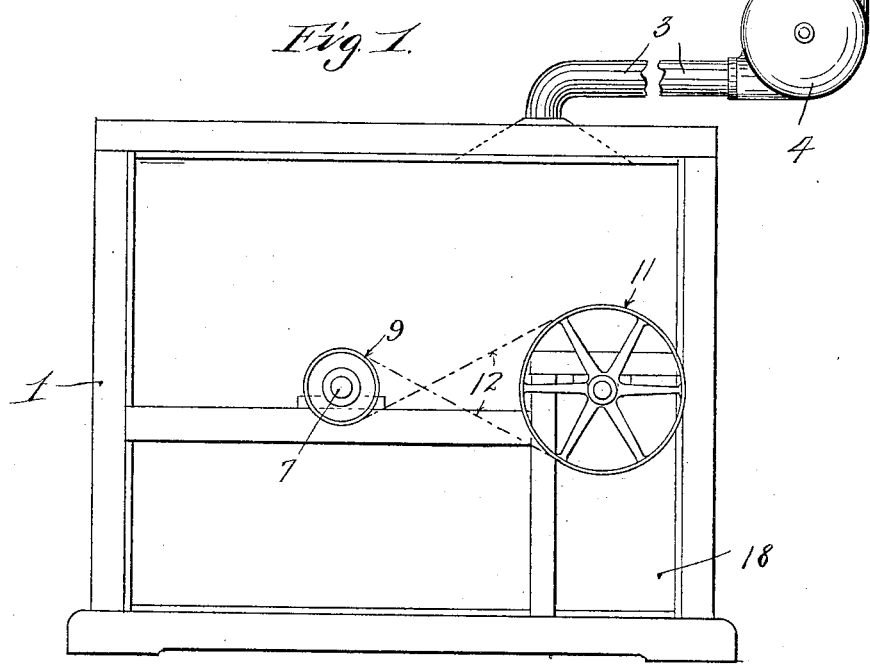
Figure 2:
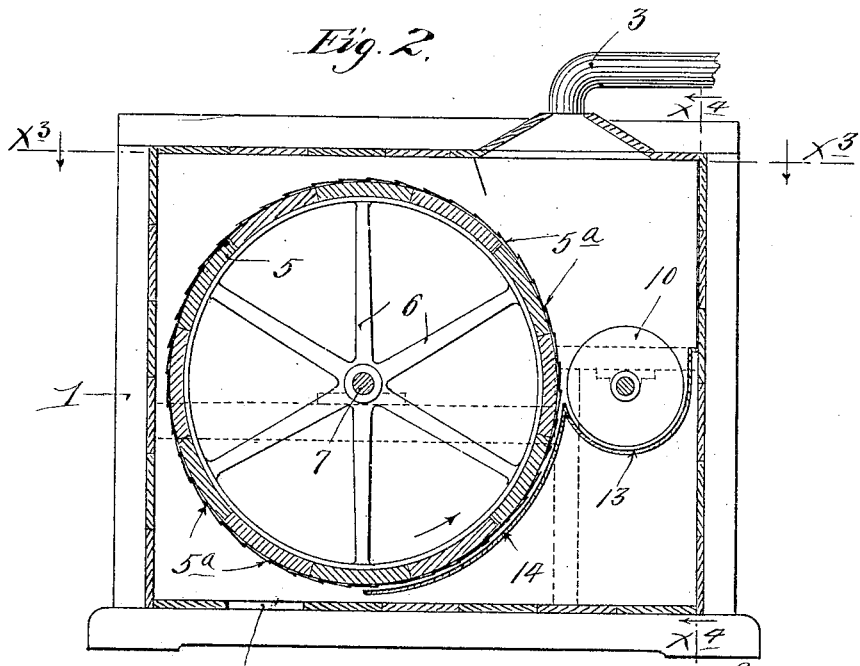

Figure 1 is an end elevation of the apparatus. Fig. 2 is a transverse vertical section on the line $x^2 x^2$ of Fig. 3. Fig. 3 is a horizontal section on the line $x^3 x^3$ of Fig. 2, and Fig. 4 is a vertical section on the line $x^4 x^4$ of Fig. 2.

The numeral 1 indicates a rectangular inclosing case or box, which is provided at its bottom with an air-inlet opening 2 and at its top with an air-outlet tube 3, which leads to a fan 4.

Working within the case 1 and extending longitudinally thereof is a large rotary drum 5, shown as secured by brackets 6 to a shaft 7, suitably journaled in the ends or heads of the case 1 and provided at its projecting ends with pulleys 8 and 9.

Extending longitudinally of the drum 5 and nearly filling the space between one side thereof and one side of the case 1 is a large feed-screw 10, the shaft of which is journaled in suitable bearings on the heads of the case 1 and projects at one end and is provided with a pulley 11, located in line with the pulley 9 of the drum-shaft 7. A twisted belt 12 (indicated by dotted lines in Fig. 1) runs over the pulleys 9 and 11 to impart a relatively slow feed movement from the drum-shaft 7 to the feed-screw 10.

The feed-spout 13 closely follows the under surface or edge of the feed-screw 10 and extends from end to end of the case 1, being rigidly secured to the latter in any suitable way. At its inner edge the said trough or spout 13 is provided with the depending segmental leaf or flap 14, which quite closely follows the periphery of the drum 5. The periphery of said drum 5 is formed with a plurality of ratchet-like cleats or serrated surfaces $5^a$, which extend from end to end of the drum. The said drum 5 when in operation rotates in the direction indicated by the arrow marked thereon in Fig. 2, and the feed-screw 10 is rotated in a direction to cause the grain to travel from the right toward the left with respect to Figs. 3 and 4.

The grain to be cleaned is fed into the receiving end of the trough 13 from a delivery-spout 15 or other suitable device, and the cleaned grain is discharged from the delivery end of said trough, as shown, directly over the depending discharge-section 16.

Preferably the bottom of the spout 13 is perforated near its delivery end, as shown at 17, and an inclined feed-board 18, supported by the case 1, underlies this perforated section 17.

The operation of the apparatus is substantially as follows: Under the action of the feed-screw 10 the body of grain delivered into the spout or trough 13 will, as already stated, be slowly worked from the right toward the left with respect to Figs. 3 and 4. Under the action of said feed-screw the said grain will further be continually forced inward over the inner edge of said trough and against the rough periphery of the drum 5, which periphery at such time is rapidly moving upward, so that it will engage the grain and throw the same upward into the air-space above the feed-screw, from whence it will be precipitated back into the said trough 13. In this way the grain which is being cleaned will be thrown in a continuous shower and will fall back onto the upper portion of the grain in the said trough, while the grain from the bottom of the spout will be continually worked upward and brought into engagement with the periphery of the drum 5. In this way each particle of the grain will in an order of rotation be thrown into the air and again precipitated. Under the action of the fan or blower 4 a strong draft of air is continually drawn inward through the opening 2 in the bottom of the case 1 and discharged outward through the tube 3 after first having passed through the grain which is flying loosely in the air-space above the feed-screw 10. This draft of air will pass principally between the segmental flap or leaf 14 and the periphery of the drum 5, and it will carry off from the grain all finely-divided and relatively light materials, such as dust, chaff, and particles of straw. Other fine but relatively heavy particles will be discharged through the perforate section 17 in the bottom of the delivery spout or trough 13. In this way the grain is very rapidly and thoroughly cleaned of all foreign materials.

It will of course be understood that the apparatus described is capable of many modifications within the scope of my invention as herein set forth and claimed. It will also be understood that the device may be used for drying grain and for various other similar purposes.

What I claim, and desire to secure by Letters Patent of the United States, is as follows:

The combination with an inclosing case, of a drum rotatively mounted therein, and provided with a roughened periphery, a conveyer-trough extending within the said case longitudinally of the said drum and with one side open and so located that the material in said trough will engage directly with the periphery of said drum above the bottom of said trough, a conveyer working with the said trough for conveying the material longitudinally of said drum and in direct contact with the roughened periphery thereof, said case providing a chamber above said conveyer, and means rotating said drum in a direction to cause its upwardly-moving peripheral portion to directly engage the material in said trough and to throw the same in a shower into the chamber above said trough and conveyer, substantially as described.

In testimony whereof I affix my signature in presence of two witnesses.

ANDREW KAMMERLOHER.

Witnesses:
ELIZABETH KELIHER,
F. D. MERCHANT.